United States Patent

Caretta et al.

[15] 3,674,899

[45] July 4, 1972

[54] PROCESS FOR CURING PNEUMATIC TIRES

[72] Inventors: Renato Caretta, Gallarate; Antonio Pacciarini, Milan, both of Italy

[73] Assignee: Industrie Pirelli S.p.A., Milan, Italy

[22] Filed: Jan. 13, 1970

[21] Appl. No.: 2,510

Related U.S. Application Data

[62] Division of Ser. No. 607,227, Jan. 4, 1967, Pat. No. 3,520,024.

[30] Foreign Application Priority Data

Jan. 13, 1966 Italy...................................13350/66

[52] U.S. Cl............................................................264/315
[51] Int. Cl..........................................................B29h 5/02
[58] Field of Search..................264/315, 326; 18/2 TB, 2 TP, 18/17 W

[56] References Cited

UNITED STATES PATENTS

| | | | |
|---|---|---|---|
| 3,378,882 | 4/1968 | Turk et al. | 18/2 TP |
| 2,741,799 | 4/1956 | Heston | 264/315 |
| 3,153,263 | 10/1964 | Mallory et al. | 18/17 W |

Primary Examiner—Robert F. White
Assistant Examiner—J. H. Silbaugh
Attorney—Stevens, Davis, Miller & Mosher

[57] ABSTRACT

A method for curing already toroidally shaped pneumatic tires. The tire beads are forced into their respective seats in axially approachable mold section while the mold sections are spaced from each other and the mold open. A flexible curing bag is introduced inside the tire, expanded, and pumped to remove air trapped between its outer surface and the inside of the tire while the beads remain in their respective seats. The mold is then closed and the tire cured. Rigid mechanical means can be used to force the beads into the seats.

4 Claims, 24 Drawing Figures

INVENTORS
RENATO CARETTA
ANTONIO PACCIARINI

BY Stevens, Davis, Miller & Mosher
ATTORNEYS

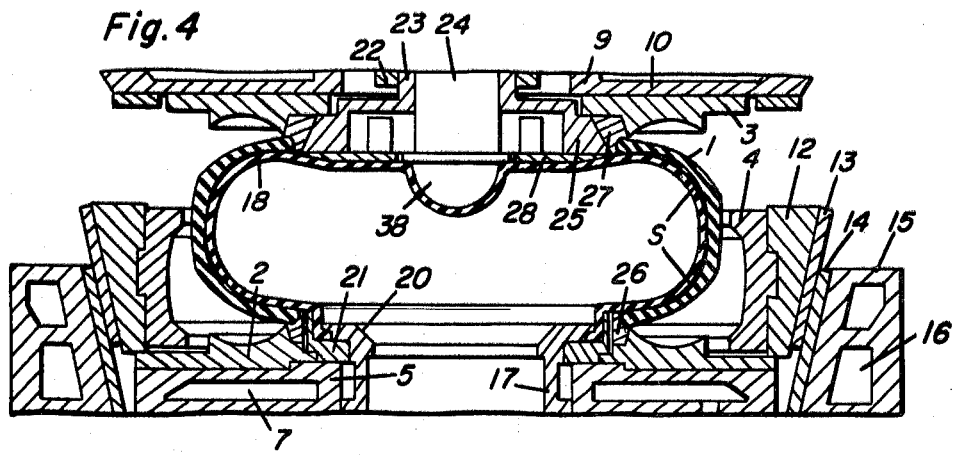
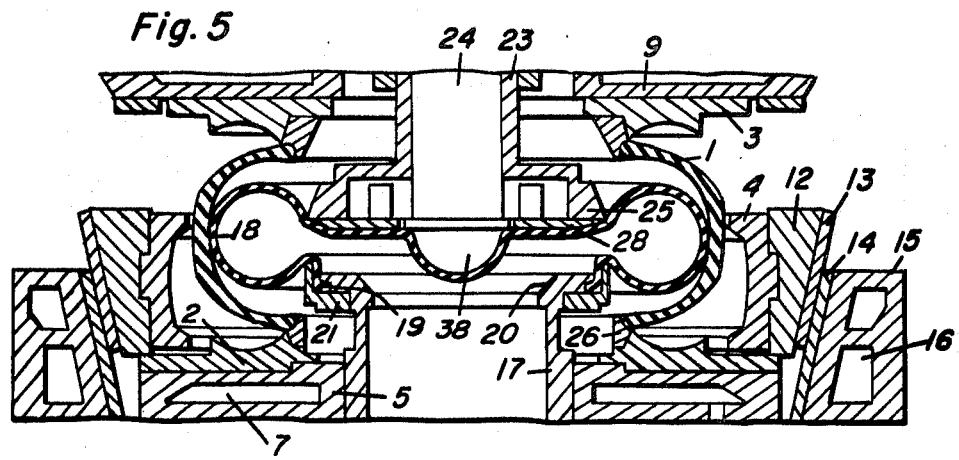
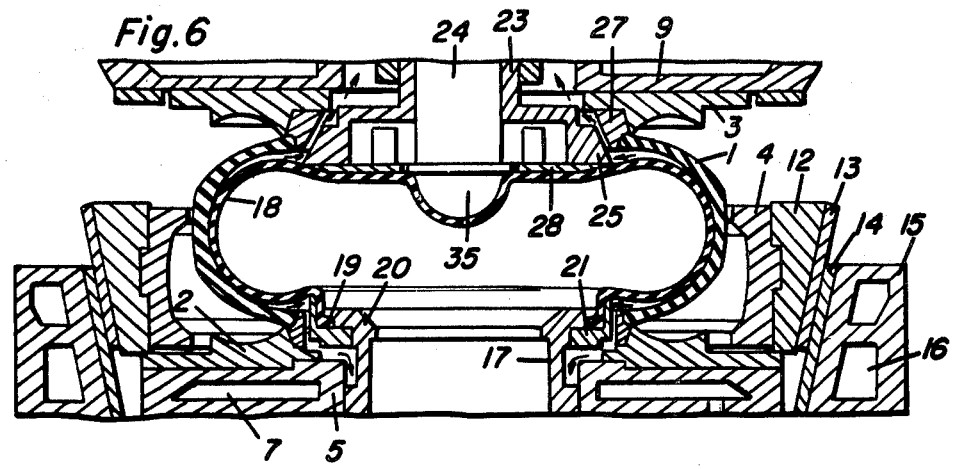

INVENTORS
RENATO CARETTA
ANTONIO PACCIARINI

BY  Stevens, Davis, Miller & Mosher
ATTORNEYS

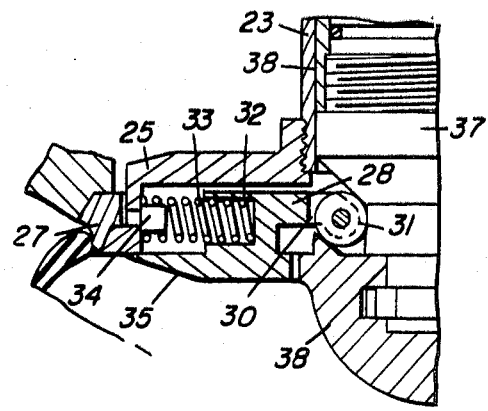
Fig. 9
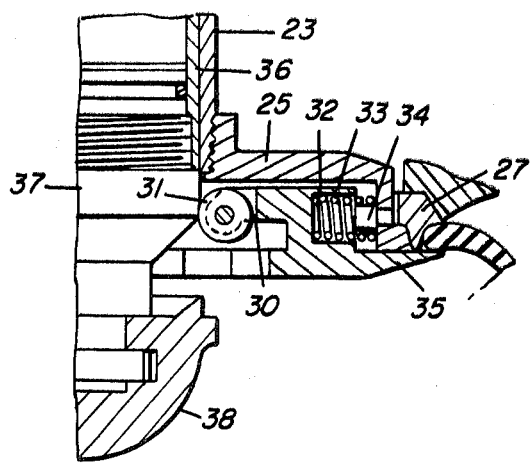
Fig. 9-A
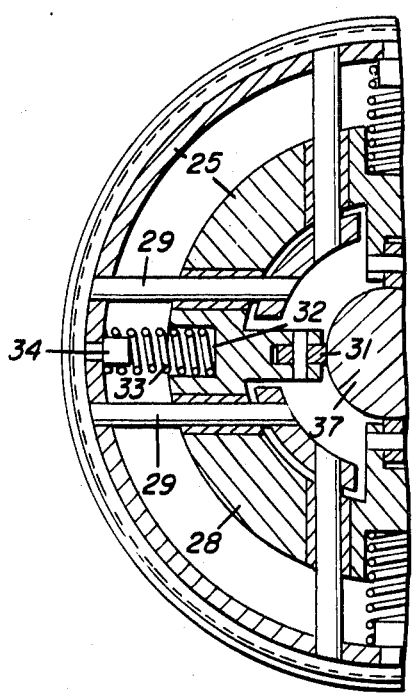
Fig. 10
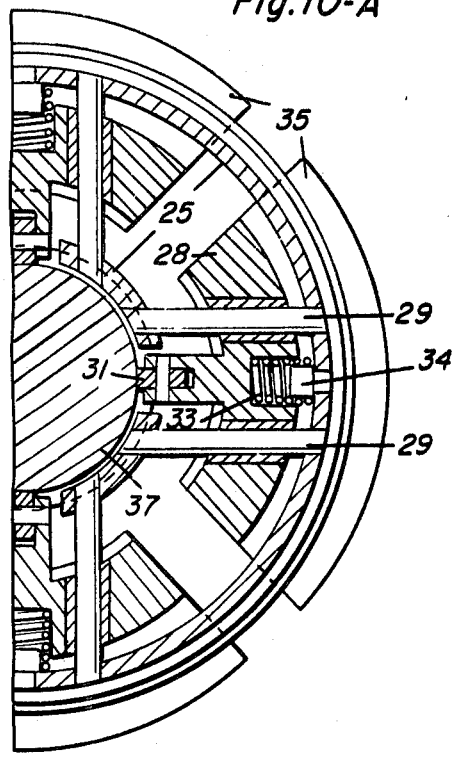
Fig. 10-A

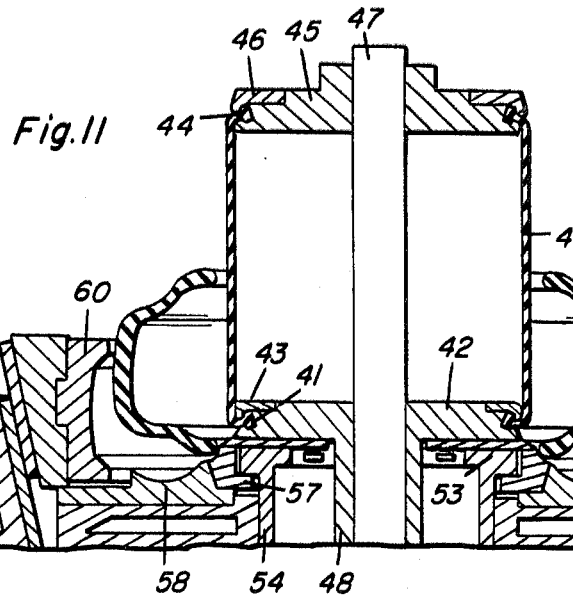
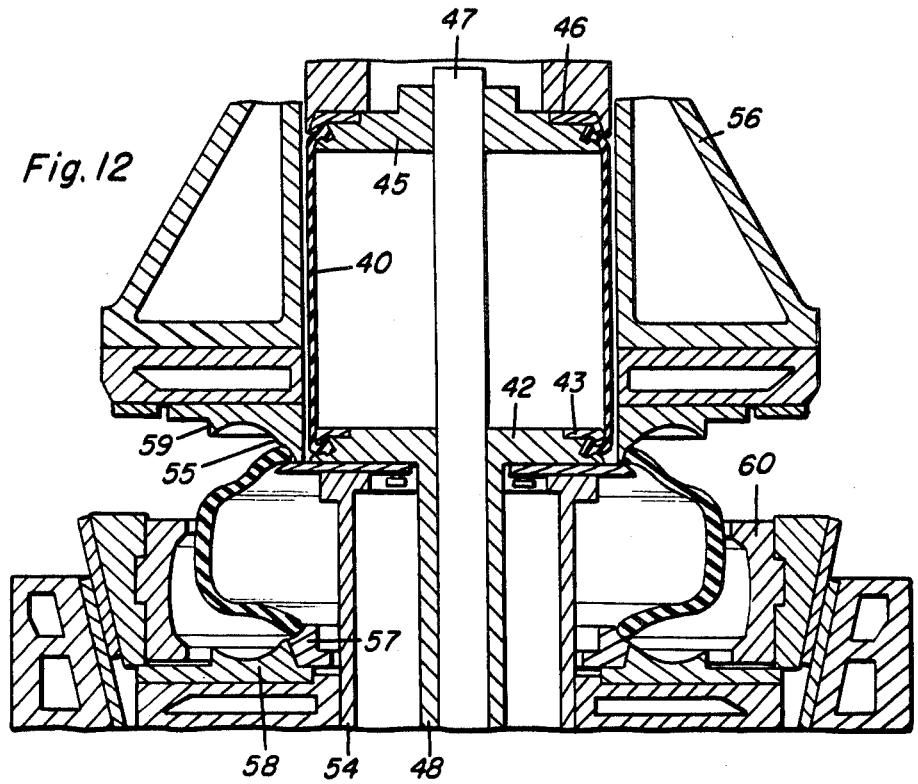

INVENTORS
RENATO CARETTA
ANTONIO PACCIARINI

BY

Stevens, Davis, Miller & Mosher
ATTORNEYS

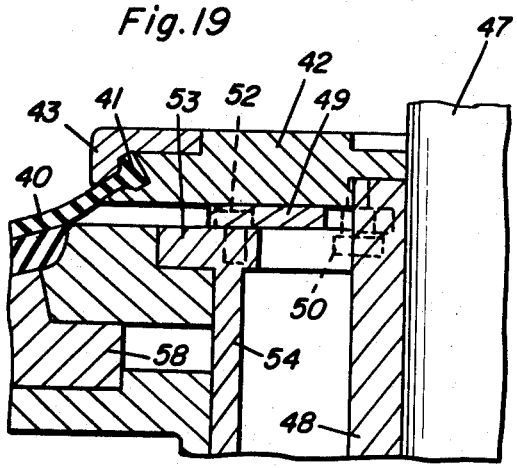
Fig.19
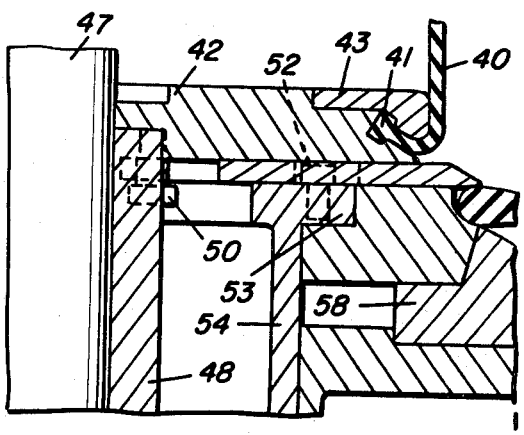
Fig.19-A
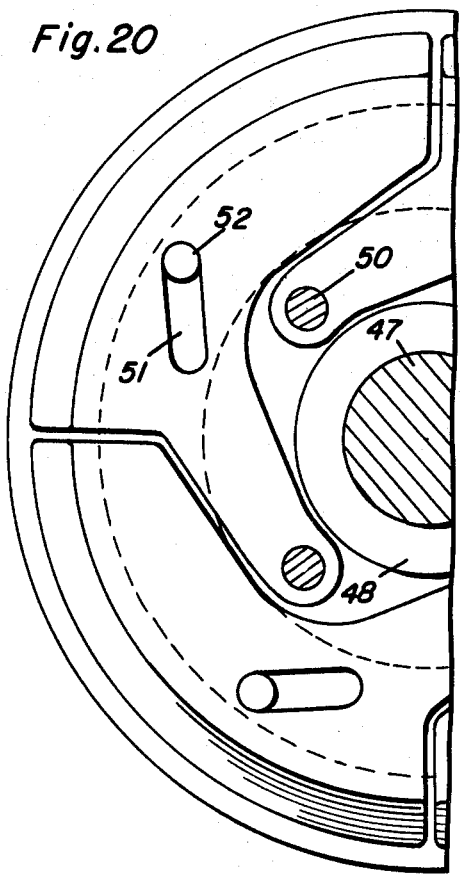
Fig.20
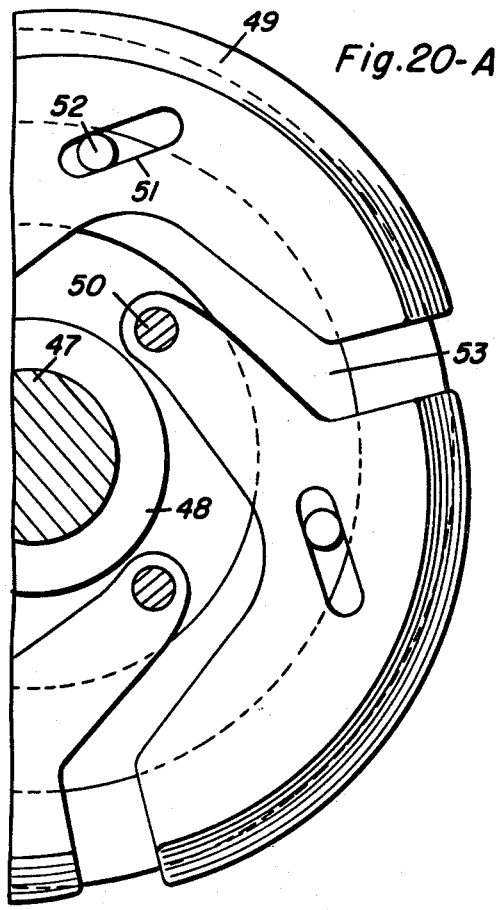
Fig.20-A

PROCESS FOR CURING PNEUMATIC TIRES

This application is a division of application, Ser. No. 607,227, filed Jan. 4, 1967, now U.S. Pat. No. 3,520,024.

BACKGROUND OF THE INVENTION

1. Field of the Invention

The present invention relates to a method for curing pneumatic tires or of similar hollow articles provided with reinforced edges, and, more particularly, to such a method utilizing a flexible curing bag inserted in the hollow article.

2. Description of the Prior Art

As it is known to the technicians skilled in the art, a curing bag is introduced into the pneumatic tire to be cured in order that heating fluid can be circulated through the bag to cure the tire. However, in these known arrangements, the curing bag is unable to adhere completely to the inner surface of the tire, since air pockets are formed between said surface and the outer surface of the curing bag itself. In fact, the curing bag, when introduced in the tire, adheres at first in a tight manner to the edges constituting the tire beads; then, by virtue of the admission of fluid under pressure in its inside, the bag expands and tends to adhere to the mid-circumferential portion of the tire, so that the air trapped between the tire and the curing bag accumulates into pockets which are located between the mid-circumferential portion and the beads of the tire. The air trapped in said pockets is subjected to a temperature rise during the curing operation and consequently tends to expand and to penetrate between the carcass plies, thus causing bubbles and detachments of the plies, resulting in a faulty cured tire.

In order to try to avoid the harmful consequences due to air occlusions between the outer surface of the curing bag and the inner surface of the tire, curing bags have been adopted which are provided on their outer surface with a knurl or with a net of grooves intended to facilitate the discharge of the trapped air, which is then able to escape through the clearances existing between the mold sections.

This solution, however, does not ensure satisfactory results since the grooves obtained on the outer surface of the curing bag are very likely to get obstructed, and the curing bag is weakened on account of the reduction in its thickness at said grooves. In addition, the pattern of the outer surface of the curing bag remains permanently molded inside the tire during the curing operation so that the inner surface of the latter becomes irregular. Therefore, in order to create vents for the air trapped in the pockets, some holes are often made by hand, with a tool, by the curing operator in proximity of the tire beads. Such holes are automatically closed during the curing operation, but, in addition to resulting in a considerable loss of time, the perforation of the tire often involves the cut of some reinforcing cords of the carcass plies which results in a reduction in the resistance of the carcass to the stresses to which it is subjected during service.

A further serious drawback which usually takes place during the introduction of the tire in the curing unit is due to the imperfect positioning of the tire in the mold, especially due to the fact that its beads come in contact with the corresponding seats provided in the mold, but do not completely penetrate into them. The beads are therefore subjected to subsequent displacements and rotations, also due to the weight of the tire itself. In this case a tire is obtained, in which the tread and the possible reinforcing annular structure are not perfectly centered, which irregularity has a dangerous effect on the behavior of the tire under service.

SUMMARY OF THE INVENTION

The object of the present invention is to provide a method which eliminates the above-indicated drawbacks, and which, in general, includes the steps of bringing the reinforced edges of the article to be molded into contact with a corresponding seat provided in a first and second mold section, respectively, forcing said edges into their corresponding seats, introducing a curing bag inside the article by admitting compressed fluid inside said curing bag, exerting a pumping action on the air trapped between the curing bag and the inside of the article at at least one of the portions limiting the reinforced edges of the article, closing the mold, and subjecting the article to the curing treatment.

This and other features of the present invention will be more clearly apparent from the following description of an embodiment of the same, illustrated by way of example in the attached drawings, in two curing units of the type described in applicant's U.S. Pat. No. 3,337,918.

BRIEF DESCRIPTION OF THE DRAWINGS

FIGS. 1 to 8 are vertical sectional views, representing the subsequent steps of the above-indicated process, carried out on a curing unit incorporating a curing bag and provided with a mold comprising a lower section and an upper section, both annular and continuous, and an intermediate section constituted by radially displaceable sectors;

FIGS. 9 and 9a are vertical sectional views, representing the apparatus provided in the curing unit shown in the preceding figures for forcing the tire beads in their respective seats, the apparatus being shown in the rest position in FIG. 9 and in the operative position in FIG. 9a;

FIGS. 10 and 10a are horizontal sectional views, representing the apparatus provided in the curing unit shown in the preceding figures for forcing the tire beads in their respective seats, the apparatus being shown in the rest position in FIG. 10 and in the operative position in FIG. 10a;

FIGS. 11 to 18 are vertical sectional views, representing the subsequent steps of the process carried out on a curing unit incorporating a curing bag, of a type different from that represented in the preceding figures, but also provided with a three-section mold; and FIGS. 19, 19a, 20 and 20a are views similar to FIGS. 9, 9a, 10 and 10a, respectively, and represent the device provided in the curing unit shown in FIGS. 11 to 18 for forcing the tire beads into their respective seats.

DESCRIPTION OF THE PREFERRED EMBODIMENTS

Figure 1:
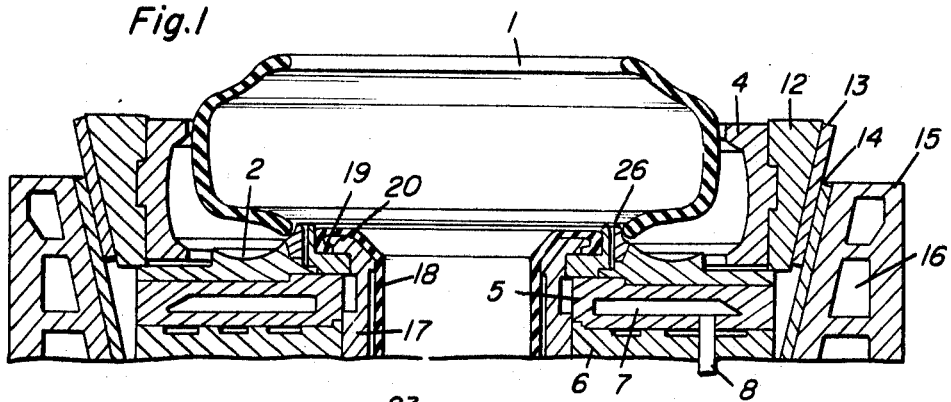

Referring specifically to FIGS. 1 to 8 of the drawings, the reference numeral 1 refers to an already generally toroidally shaped pneumatic tire carried by a curing unit provided with a mold divided into three sections, namely a lower section 2 and an upper section 3, both annular and continuous, and an intermediate section including a plurality of annular sectors 4 which can be displaced either centripetally or centrifugally with respect to the axis of the curing unit.

Figure 2:
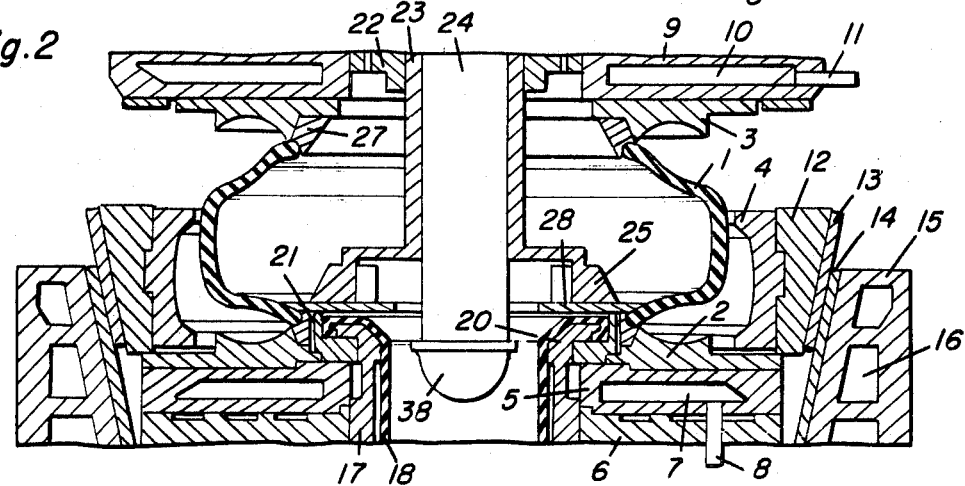

As shown in FIG. 2, the lower section 2 is secured to the outer surface of a plate 5 integral with the base 6 of the curing unit. Temperature conditioning fluid is circulated within recesses 7 formed in plate 5, said fluid being admitted and discharged through suitable ducts 8. The upper section 3 is secured to the lower surface of a plate 9 housed inside the lid of the curing unit and provided with recesses 10, within which temperature conditioning fluid is circulated, said fluid being admitted and discharged through suitable ducts 11. The intermediate section consists of a plurality of annular sectors 4, each of which is supported by a corresponding support 12. Inclined planes 13, sliding on guides 14, are provided for the displacement of said sectors 4, the number of the planes being equal to that of the corresponding sectors and supports.

The guides 14 are integral with the sides 15 of the base 6, sides 15 being provided with recesses 16 within which temperature conditioning fluid is circulated, said fluid being admitted and discharged through ducts similar to the preceding ones, but not shown in the figures.

Figure 3:
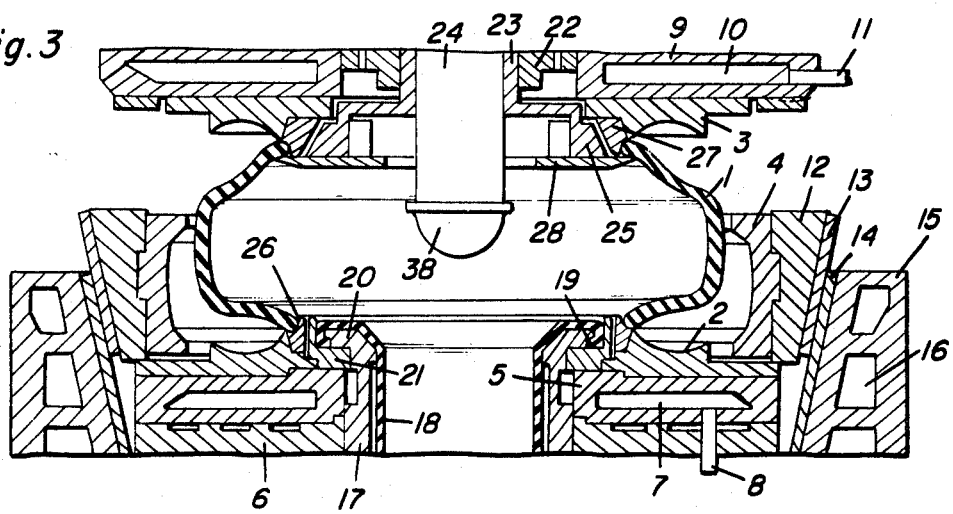

As shown in FIG. 3, the central part of the base 6 contains a cylindrical container 17 adapted to slide in a vertical direction, and within which is disposed, in rest position, a flexible bag 18. This bag generally has a toroidal shape and its edge 19 is clamped between the edge 20 of the container 17 and a ring 21 integral therewith.

A cylinder 22 is assembled inside the lid of the curing unit, said cylinder being coaxial with the plate 9, and containing a hollow cylinder 23 which, in turn, contains a stem 24. Cylinder 23 and stem 24 are slidable together or separately within the cylinder 22 by means of suitable controlling devices not represented in the figure.

At its lower end, the cylinder 23 terminates with a bell-shaped enlarged crown 25, in which are assembled the mechanical means for forcing the beads of the tire into the corresponding seats obtained in the rings 26 and 27 of the lower and upper half molds, respectively.

With reference to FIGS. 9, 9a, 10 and 10a, the means for forcing the beads into their seats comprise a plurality of sectors 28 which, through pins 29, are supported by the crown 25. Each of the sectors 28 is provided with an extension 30, on which is pivoted a small wheel 31. Also provided in each sector 28 is a recess 32, in which is inserted a cylindrical helical spring 33 wound about a pin 34 radially disposed inside the crown 25. A blade-shaped extension 35 extends from each sector 28.

The stem 24 is hollow and has a cylinder 36 extending therein. At the lower end of cylinder 36 is screwed a core 37, formed by two cylindrical portions having different diameters and connected by a frusto-conical portion. A hemispherical cap 38 is secured at the lower end of the core 37.

The steps of the method of the present invention are generally represented by FIGS. 1 to 8. As shown in FIG. 1, the curing unit is completely opened and the tire 1 is disposed on the lower section 2 of the mold, with its lower bead lying on the ring 26.

As shown in FIG. 2, the lid of the curing unit is then lowered until the ring 27 of the upper section 3 of the mold comes into contact with the upper bead of the tire. At the same time the stem 24 is lowered further to the proximity of lower ring 26 and, as shown in the right half of FIGS. 9 and 10, the core 37 is also lowered by sliding within the stem 24. Consequently, the sectors 28 are centrifugally pushed by virtue of the rolling of the small wheels 31 along the frusto-conical surface of the core 37, while the springs 33 are compressed. At the end of the movement of sectors 28 towards ring 26, the extensions 35 protrude beyond ring 26 and force the lower bead of the tire into the corresponding seat provided on ring 26 so as to ensure a correct positioning and an efficient fastening of the tire.

As shown in FIG. 3, the upper bead is then forced into its corresponding seat provided on the ring 27. For this purpose the stem 24 is caused to slide upward together with the cylindrical body 23 and crown 25 to the position as shown in order that the mechanical forcing devices may force the upper bead of the tire into its corresponding seat in the same way as described above in respect to the lower bead. After this has been achieved, the sectors 28 are centripetally displaced by operating, in an opposite sense to that indicated above, the devices assembled in the crown 25, the hollow stem 24 thus being caused to slide upward within the cylindrical body 23.

The tire 1 is now fixedly secured to the lower and upper sections of the mold and, as shown in FIG. 4, the curing bag 18 is inserted within said tire by admitting fluid under pressure in the lower part of the container 17.

The curing bag 18, owing to the action of the fluid under pressure, is pushed outside the container 17, penetrates into the tire, and adheres initially to the mid-circumferential band of the tire, and progressively to positions nearer and nearer to the beads. In this way air pockets S are formed between the outer surface of the curing bag and the inner surface of the tire, in proximity of the beads.

FIGS. 5 and 6 represent the method for eliminating the air trapped in the pockets S. The stem 24 is pushed downward together with the cylindrical body 23, while the container 17 is pushed upward so that the curing bag 18, whose edge 19 is clamped between the edge 20 of the container 17 and the ring 21, is thus forced to contract, this movement being further aided by the downward movement of hemispherical cap 38 on stem 24, and by the surface formed by sectors 28. In this manner the curing bag 18 adheres to the inner surface of the tire only along a mid-circumferential band of the latter.

It is to be understood that the pumping action, consisting of contracting and expanding the curing bag, can be carried out only partially, namely by displacing only the container 17 without causing the stem 24 to slide, in which case the curing bag 18 detaches only in its lower part from the inner surface of the tire 1, or vice versa.

The following step of the cycle, represented in FIG. 6, concerns the re-expansion of the curing bag 18 which causes the complete expulsion of air between it and the tire, thus allowing the curing bag to adhere progressively to the whole inner surface of the tire, starting from the above-cited mid-circumferential band. Air so expelled is completely discharged through the clearances of the mechanical parts constituting the curing unit as indicated by the arrows in FIG. 6.

Figure 7:
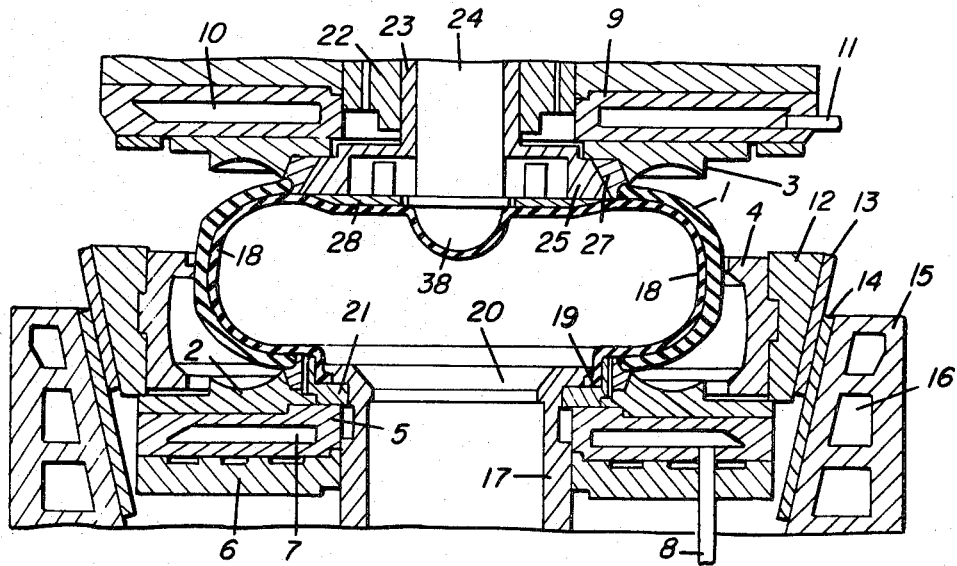

FIG. 7 depicts the manner in which the curing bag 18 adheres perfectly to the inner surface of the tire 1 at the end of the above operation.

Figure 8:
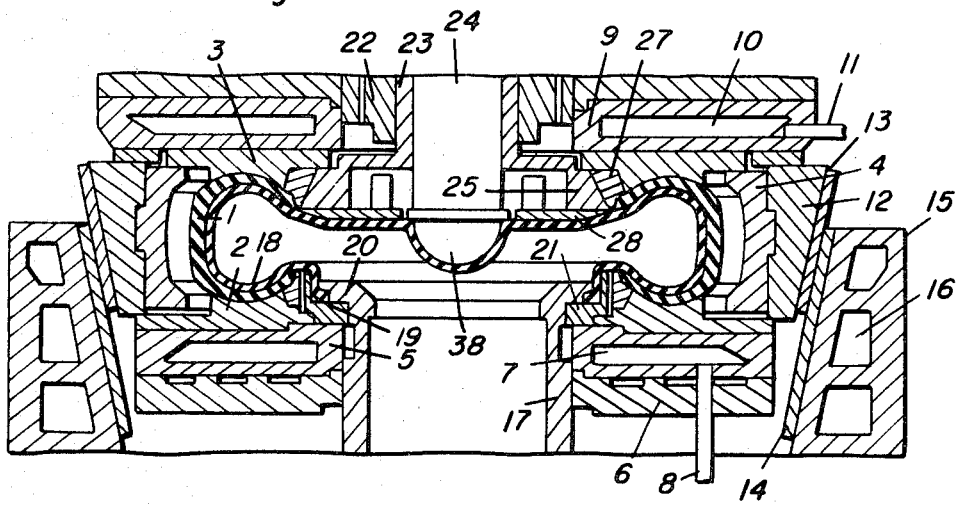

FIG. 8 shows the final position taken by the upper section 3 of the mold for the curing operation after a subsequent partial lowering of the lid of the curing unit.

The complete lowering of the lid causes the centripetal displacement of the sectors 4 constituting the intermediate section of the mold, and therefore, the total closure of the curing unit, as more specifically disclosed in the cited U.S. Pat. No. 3,337,918.

During the various steps of the operating cycle the tire 1 remains firmly secured, since its beads have been initially forced in the suitable seats provided on the rings 26 and 27 of the lower sector 2 and of the upper sector 3, respectively, of the mold.

FIGS. 11 to 18 represent the steps of the method carried out on a curing unit different from that described in the preceding embodiment. As indicated in FIG. 11, this second curing unit comprises a flexible curing bag 40 assembled with vertical axes, which in the rest position takes a cylindrical shape. The inner edge 41 of this curing bag is clamped between a disk 42 and a ring 43, and the outer edge 44 of said curing bag is likewise clamped between a disk 45 and a ring 46. The disk 42 is assembled on a vertical stem 47 by means of a sleeve 48, stem 47 being axially slidable within the sleeve 48, while disk 45 is keyed on the stem 47.

FIGS. 19, 19a, 20 and 20a depict the apparatus for forcing the beads of the tire into the suitable seats obtained in the mold sections according to the embodiment of FIGS. 11 to 18.

This apparatus is disposed below the disk 42 and comprises a plurality of sectors 49 pivoted on the lower surface of said disk and adapted to rotate about the fixed pins 50. Each sector 49 is provided with a grooved guide 51 within which is inserted a pin 52 secured on the upper crown 53 of a cylinder 54 which is encased in the base of the curing unit, is coaxial with the stem 47, is adapted to rotate about its own axis, and is displaceable in a vertical direction.

In FIGS. 19 and 20 the sectors 49 are represented in rest position, while in FIGS. 19a and 20a they are represented in their expanded position for forcing the bead of the tire into its corresponding seat. The latter position is achieved after the rotation of the crown 53 in a counterclockwise direction has caused the rotation of the sectors 49 about the pins 50 due to the action of pins 52 in the guides 51, so as to displace said sectors centrifugally. To bring the sectors from the expanded position to the rest position, the operation is carried out by rotating the crown 53 in a clockwise direction.

FIGS. 11 to 18 represent the steps of the process forming the object of the invention, which are the same described with reference to FIGS. 1 to 8.

FIG. 11 represents the tire after it has been inserted on the curing bag 40, the latter having a cylindrical shape since the disks 42 and 45 to which its edges are fixed have been brought to the greatest possible axial distance from each other, the tire being positioned with its lower bead lying on the ring 57 of the lower section 58 of the mold.

Then, as shown in FIG. 12, the lid 56 of the curing unit, to which the upper section 59 of the mold is fixed, is lowered until the upper bead of the tire comes in contact with the corresponding seat 55 provided in section 59. To force the upper bead in its seat, the cylinder 54 is pushed upward and the sectors 49 are expanded by rotating the cylinder 54 about its own axis.

Figure 13:
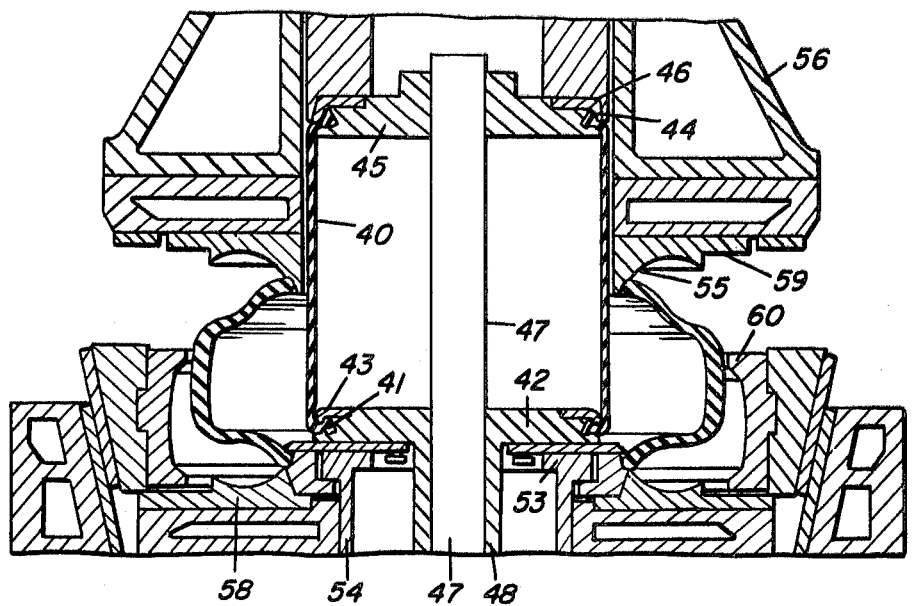

Subsequently, as shown in FIG. 13, the cylinder 54 is again pushed downward together with the curing bag 40 connected to it, and the sectors 49, maintained in their expanded position, force the lower bead of the tire in the seat formed on the ring 57 of the lower section 58 of the mold.

Figure 14:
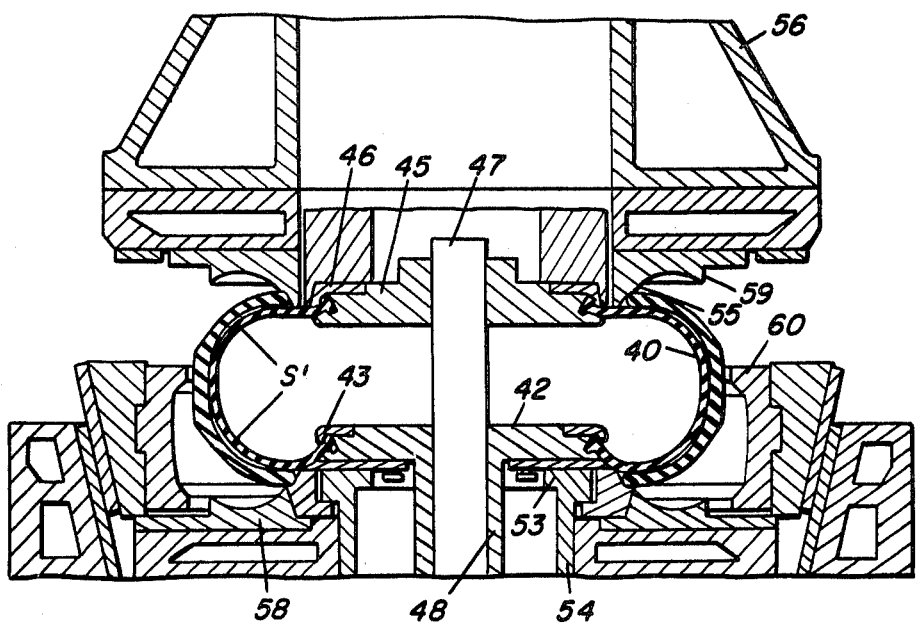

To insert the curing bag 40 in the tire, after having brought the sectors 49 to their rest position, the stem 47 is caused to slide within the sleeve 48 as illustrated in FIG. 14, so that the disk 45 approaches disk 42, after which compressed fluid is admitted inside the curing bag 40 through an opening not shown in the FIGS.

Figure 15:
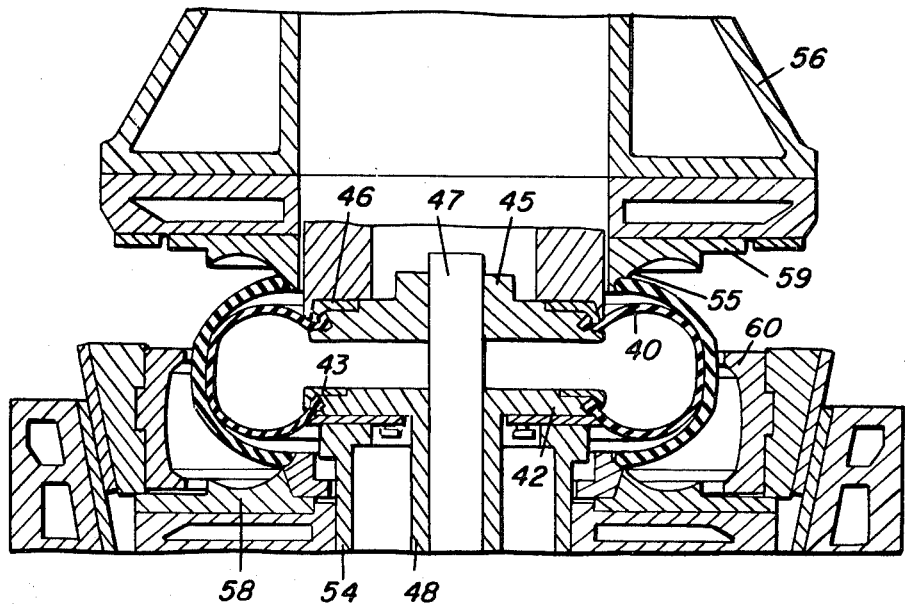
Figure 16:
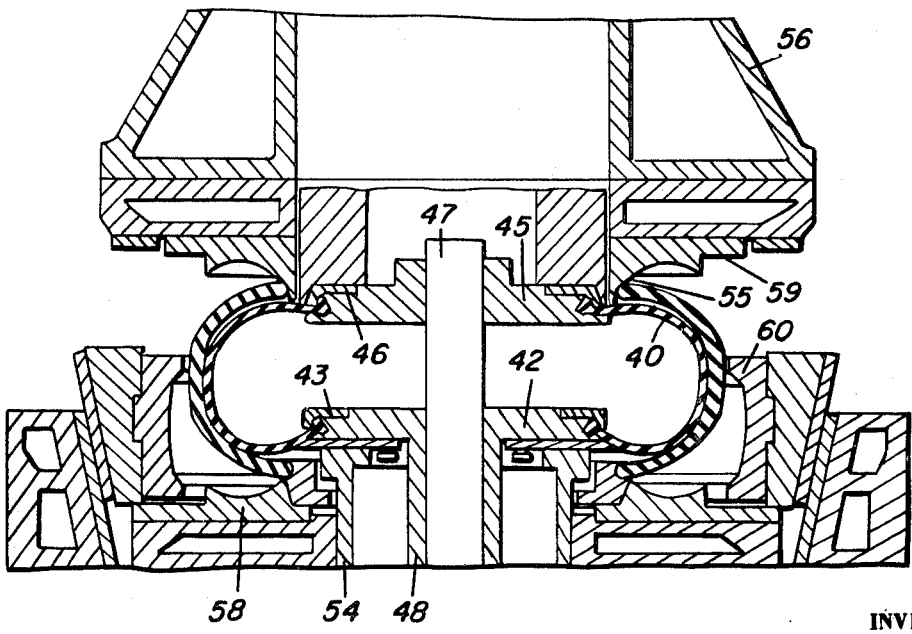

It has been discovered that air initially filling the tire is unable to escape completely, causing air pockets S' to form between the outer surface of the curing bag and the inner surface of the tire. To eliminate these pockets, the stem 47 is caused to slide downward and the cylinder 54 upward, as shown in FIG. 15, so as to cause mutual approach of disks 42 and 45 to which the edges of the curing bag 40 are clamped.

The curing bag is therefore compelled to contract and remains adherent to the inner surface of the tire only along a mid-circumferential band thereof. The stem 47 and the cylinder 54 are then mutually displaced, as shown in FIG. 14, by raising stem 47 and lowering cylinder 54 so as to cause the curing bag 40 to adhere again progressively to the inner surface of the tire, starting from said mid-circumferential band. In this way it is possible to eliminate the air trapped in the pockets which, following the path indicated by the arrows, passes through the clearances existing between the mechanical parts constituting the curing unit. It is to be understood that the pumping action, consisting of contracting and expanding the curing bag, can be carried out only partially, when sufficient, by displacing only one of the disks 42 or 45, the other of which is kept stationary.

Figure 17:
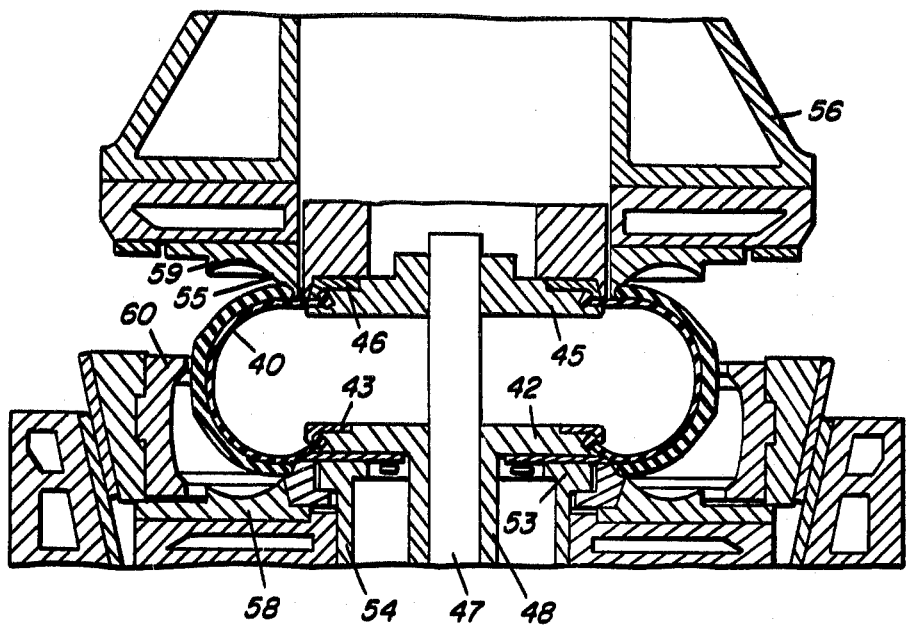

The curing bag 40 is thus caused to adhere completely, as shown in FIG. 17, to the inner surface of the tire, which, having its two beads firmly secured in the suitable seats provided in the lower section 58 and the upper section 59 of the mold, remains correctly positioned during the whole cycle.

Figure 18:
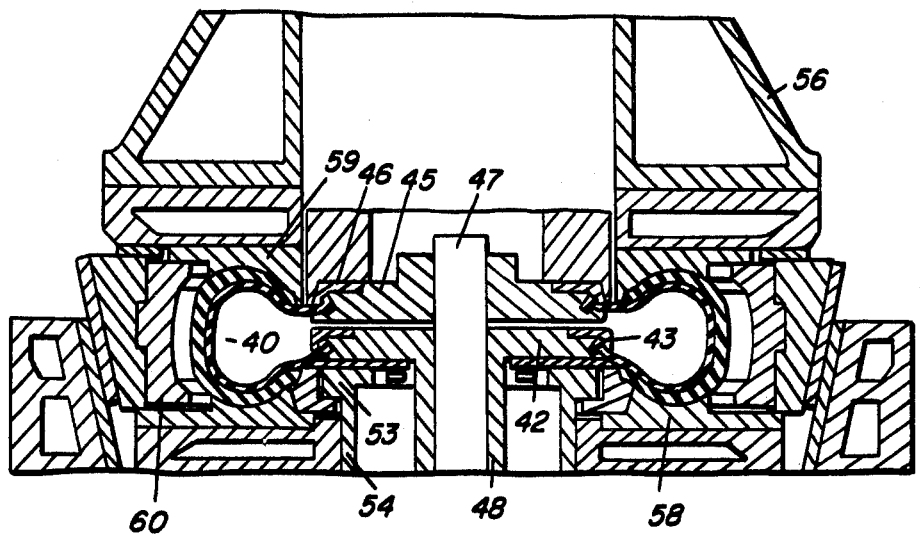

The mold is then closed, as shown in FIG. 18, by further lowering the lid 56 of the curing unit, to which the upper section 59 of the mold is fixed. The lowering of the lid 56 causes the lowering of the disk 45 which is integral with the stem 47. The latter thus slides within the sleeve 48 and causes the centripetal displacement of the sectors 60 of the intermediate section of the mold, in the manner disclosed in U.S. Pat. No. 3,337,918.

It is understood that the process forming the object of the present invention can be carried out with different means without falling out of the scope of the invention itself. For example, it can be carried out by means of a curing unit provided with a mold constituted only by two annular continuous sections.

In conclusion, the main advantage of the present invention consists in the complete elimination of the air trapped between the outer surface of the curing bag and the inner surface of the tire during the curing process, which is effected with a simpler, more rapid and more efficient method with respect to those adapted in the art up to the present time.

In achieving the above, it is necessary, not only to position the tire beads in the corresponding seats provided in the mold of the curing unit, but also to force the beads in said seats, since it is absolutely necessary for the tire to be firmly secured during this treatment and during curing of the tire. Thus the anchoring apparatus of the present invention is obviously very advantageous since possible deformations and displacements of the tire elements are prevented.

Of course, variations of the specific construction and arrangement of this type mechanism herein disclosed can be made by those skilled in the art without departing from the invention as defined in the appended claims.

We claim:

1. A method for curing hollow, already generally toroidally shaped rubber tires which include two beads, comprising:
   a. forcing the tire beads of the tire into respective seats of two separate axially approachable mold sections while maintaining said mold sections axially spaced apart from each other whereby the mold is in open condition;
   b. introducing a flexible curing bag into the tire and expanding said bag by admitting compressed fluid thereinto whereby said bag substantially completely fills the interior of said tire;
   c. contracting and re-expanding said bag by displacing a radially inner portion thereof axially towards and then away from the mid-circumferential plane of the tire in a manner whereby an outermost radial portion of said bag remains in outwardly pressing contact with the inner wall of said tire along its mid-circumferential plane without displacing therefrom said beads from said seats during said contracting and re-expanding; and then
   d. closing the mold by axially approaching said mold sections towards each other and curing the tire within the closed mold.

2. The method of claim 1, wherein the tire beads are forced into said seats by rigid mechanical means.

3. The method of claim 1, wherein said contracting is carried out by simultaneously displacing a radially inner part of both axially opposed radial walls of said bag towards each other whereby said bag peels away from the inner wall of said tire progressively from the beads thereof and in the direction towards the tire mid-circumferential plane, and said re-expanding is carried out by permitting said walls to move axially apart from each other whereby said bag progressively expands against the tire inner wall in the direction from the mid-circumferential plane towards said beads.

4. The method of claim 1, wherein heated fluid is admitted to said bag and circulated through jackets in said mold sections to effect curing of said tire.

* * * * *